United States Patent [19]

Hitzman

[11] 4,450,908

[45] May 29, 1984

[54] ENHANCED OIL RECOVERY PROCESS USING MICROORGANISMS

[75] Inventor: Donald O. Hitzman, Bartlesville, Okla.

[73] Assignee: Phillips Petroleum Company, Bartlesville, Okla.

[21] Appl. No.: 374,540

[22] Filed: Apr. 30, 1982

[51] Int. Cl.³ .................................................. E21B 43/22
[52] U.S. Cl. .................................... 166/246; 166/273
[58] Field of Search ............... 166/246, 273, 274, 270; 435/281

[56] References Cited

U.S. PATENT DOCUMENTS

| | | | |
|---|---|---|---|
| 1,998,756 | 4/1935 | Grebe et al. | 166/246 |
| 2,259,419 | 10/1941 | Hefley et al. | 252/8.5 |
| 2,413,278 | 12/1946 | Zobell | 166/246 X |
| 2,660,550 | 11/1953 | Updegraff et al. | 166/246 |
| 2,807,570 | 9/1957 | Updegraff | 166/246 |
| 3,185,216 | 5/1965 | Hitzman | 166/246 |
| 3,340,930 | 9/1967 | Hitzman | 166/246 |
| 3,684,710 | 8/1972 | Cayle | 252/8.55 |
| 4,039,028 | 8/1977 | Knight | 166/246 |
| 4,165,257 | 8/1979 | Stokke | 435/262 |

*Primary Examiner*—Stephen J. Novosad

[57] ABSTRACT

Residual polymeric material from a post-secondary oil recovery operation is consumed by microorganisms injected into the oil-bearing reservoir. The resulting metabolic products, including surfactant-acting substances, enhance additional oil production from the reservoir.

7 Claims, No Drawings

ENHANCED OIL RECOVERY PROCESS USING MICROORGANISMS

The invention relates to oil production. In a further aspect, the invention relates to a post-primary oil recovery process using polymeric materials. The invention further relates to a tertiary oil recovery process using microorganisms.

Petroleum is recovered from underground oil-bearing reservoirs by penetrating the reservoir with one or more wells and permitting the oil to flow to the surface or pumping it to the surface through the wells. When there is sufficient pressure available in the form of an underlying active water drive, gas dissolved in the petroleum, or a high-pressure gas cap over the petroleum, this naturally-present force can be exploited to force the petroleum to the surface. When the reservoir does not have this natural pressure or when it is depleted by recovery of a portion of the oil and gas in the reservoir, oil will not flow naturally to the surface and methods must be devised to recover this residual oil supply. The recovery of oil using the natural reservoir pressure is called primary recovery. Methods of post-primary recovery have been developed to supply additional pressure to force remaining oil to the producing well or to reduce the forces tending to prevent the flow of oil through the reservoir.

Waterflooding is a method used to displace petroleum toward the producing well. Water-soluble thickening agents are often used in waterflooding processes for a variety of functions. For example, a thickening agent can be added to a water drive in order to increase the efficiency of the water drive in driving oil from the reservoir. Thickening agents are also used in tertiary recovery processes for mobility control and as diversion agents. The thickening agents include polymeric viscosifiers.

Such viscosifying agents enable the recovery of additional oil, but as they pass through the reservoir, a portion is adsorbed onto the reservoir rock. It would be desirable to use this otherwise-lost polymeric material adsorbed by the reservoir in the recovery of additional oil from the reservoir.

It is therefore an object of the invention to enhance the recovery of oil from an oil-bearing reservoir. It is a further object to use polymeric materials which have been adsorbed by the reservoir in producing additional oil from the reservoir.

SUMMARY OF THE INVENTION

According to the invention, an aqueous solution of a microorganism is injected into an oil-bearing reservoir which contains a polymeric material which the microorganism is capable of metabolizing and the microorganism is allowed to consume the polymeric material, thereby producing various extracellular products including acids, solvents, surfactants and other substances which promote the release of oil from the formation. The polymeric material can be residual material from a water slug containing a polymeric viscosifying agent which is adsorbed onto the reservoir surfaces as the water slug proceeds through the reservoir. The gaseous product will generally comprise carbon dioxide, hydrogen, methane and additional extracellular products such as organic acids, and these products act on the remaining oil in the reservoir to reduce its viscosity and promote the production of additional oil. The process also has the beneficial effect of "cleaning up" the reservoir of residual polymeric material.

DETAILED DESCRIPTION OF THE INVENTION

Any microorganism, including bacteria, yeast and fungi, capable of degrading polymeric material is suitable for use in the invention process. Examples of such microorganisms include Clostridium, Pseudomonas, Bacillus, Achromobacter, Alcaligenes, Bacterium, Chromobacterium, Corynebacterium, Eschereschia, Lactobacillus, Methanomonas, Micrococcus Mycobacterium, Propionobacterium, Proteus, Sarcina, Vibrio, Desulfovibrio, and mixtures thereof. Species of such organisms include *Clostridium acetobutylicum, Pseudomonas aeroginosa, Bacillus subtilis, Proteus vulgaris, Micrococcus albus, Desulfovibrio desulfuricans.*

The microorganism used will generally be injected into the formation in an aqueous solution or dispersion. The inoculum will be of an amount sufficient to establish a viable, self-perpetuating growth population. It will generally be desirable to inject a highly-concentrated, fluid aqueous dispersion of the microorganism, for example, a concentration of about $10^6$–$10^{11}$ cells/cc.

The polymeric materials which are consumed by the microorganisms can be any polymers which would be injected into an oil-bearing reservoir. Polymers are used, for example, for such purposes as mobility control, viscosification, and fluid diversion during secondary water flood operations. The injection of a microbial culture selected to degrade residual polymers permits the recovery of additional oil through the effects of microbial growth and their metabolic products.

Polymeric materials suitable for the invention process and used in oil recovery processes include biopolymers, polyacrylamides, heteropolysaccharides, and celluloses. Examples of biopolymers include Xanthans, phosphomannans, scerolglucons, glucans, starches, dextrans, and the like. Celluloses include such materials as carboxymethylcellulose and diethylcarboxymethylcellulose.

The procedure used to degrade the residual polymeric materials will of course vary depending upon the reservoir conditions and type of polymer in the reservoir. First, a suitable genus of microorganism is selected. A concentrated aqueous dispersion of the microorganism is prepared and is injected via an injection well into the polymer-containing reservoir. The solution is injected under sufficient pressure to force the inoculum to the location of adsorbed polymer.

After injection into the polymer-containing reservoir, the microorganisms are permitted to contact the polymer and metabolize the absorbed polymer and degradation products thereof. The metabolic products such as organic acids, carbon dioxide, solvents, surfactants, and methane act to release additional oil from the formation. The microorganism growth continues until the residual polymeric material is consumed.

To illustrate a situation in which it would be desirable to employ the process of the invention, it is current practice to inject polyacrylamide for viscosity improvement. The polymeric slug is followed by an aqueous slug to push the polymer through the reservoir. As the polymer advances through the reservoir, a portion of it is adsorbed onto the reservoir surfaces, typically 50–100 pounds of polymer being absorbed per acre-foot of reservoir rock contacted. After polymer injection is complete and subsequent waterflooding is reinstituted, the push water or subsequent aqueous slug is inoculated with a microorganism culture which will degrade and use the absorbed polymer as a food source.

In a typical field application, a 1400 acre field comprising approximately 56,000 acre feet of reservoir is treated with about 4 million pounds of polymer. Any time after waterflooding for post-primary recovery is begun on the polymer treated reservoir, an inoculum of appropriate microorganism(s) is injected. There is no limit on the amount of microorganism that can be injected, although typically for convenience and economic reasons 100–10,000 L of solution containing $10^6$–$10^{11}$ cells/cc would be injected. The organisms inoculated will generally be injected as a mixed culture. Thus, where polyacrylamide polymers are employed, sulfate reducing bacteria would be preferred for the process of this invention. An exemplary mixture of such organisms would comprise *Desulfovibrio desulfuricans, Clostridium acetobutylicum,* and *Psuedomones aeroginosa.*

The microorganisms can be injected into the formation as a single slug, intermittently or continuously. If injected as a slug, the well could be closed to production for a time to allow cell growth and metabolic products such as $CO_2$, methane, organic acids, and hydrogen to collect, increasing formation pressure and solubilizing residual oil in the formation. Alternatively, the injection of microorganism (as a slug or otherwise) could be followed by continued waterflooding, so that the injected microorganisms slug could be pushed through the formation by the waterflood and consume adsorbed polymer as it goes. Depending upon the type of microorganism(s) injected, the extent of polymer degradation required, and the mode of injection, the microorganisms will be permitted to metabolize and grow for a period of about a month to about two years or more. The initial polymer slug will be protected against the microorganisms by the water following it.

The invention method for removal of residual polymeric material from an oil-bearing reservoir can be used as a step in a polymer flood process involving the steps of, for example, optional aqueous preflush to adjust connate water salinity, a subsequent thickened aqueous slug such as aqueous polyacrylamide, and an aqueous drive fluid containing microorganisms. The microorganisms metabolize adsorbed polymeric viscosifier lost to the reservoir from the thickened aqueous slug thereby producing products such as carbon dioxide, hydrogen, methane and organic acids to reduce the viscosity of the oil and thereby promote the release of additional oil from the formation.

I claim:

1. A process for the recovery of oil from an underground oil-bearing reservoir containing polymer-adsorbing rock comprising the steps of:
   (a) injecting a polymeric viscosifier-thickened aqueous slug into the reservoir via an injection well;
   (b) subsequently injecting an aqueous slug into the reservoir via the injection well and forcing the aqueous slug through the reservoir so as to push the polymeric viscosifier toward the production well;
   (c) subsequently injecting an aqueous solution of a microorganism capable of metabolizing the polymeric viscosifier into the reservoir via the injection well and forcing the microorganism through the reservoir toward the production well;
   (d) subsequently injecting a drive fluid into the reservoir via the injection well and driving oil toward the production well; and
   (e) producing oil via the production well.

2. The process of claim 1 in which the polymeric viscosifier is a biopolymer.

3. The process of claim 1 in which the polymeric viscosifier is selected from the group consisting of Xanthans, phosphomannans, scerolglucons, glucans, starches, dextrans, and mixtures thereof.

4. The process of claim 3 in which the microorganism is selected from the group consisting of Clostridium, Pseudomonas, Bacillus, Achromobacter, Alcaligenes, Bacterium, Chromobacterium, Corynebacterium, Eschereschia, Lactobacillus, Methanomonas, Micrococcus Mycobacterium, Propionebacterium, Proteus, Sarcina, Vibrio, Desulfovibrio, and mixtures thereof.

5. The process of claim 1 in which the polymeric viscosifier is polyacrylamide.

6. The process of claim 5 in which the microorganism remains in the reservoir for a time of at least about 30 days before the injection of the drive fluid to drive oil toward the production well.

7. The process of claim 5 in which the microorganism solution comprises *Desulfovibrio desulfuricans.*

* * * * *